(12) United States Patent
Yoshida et al.

(10) Patent No.: US 9,158,417 B2
(45) Date of Patent: Oct. 13, 2015

(54) POSITION DETECTION SYSTEM AND DISPLAY SYSTEM WITH INPUT FUNCTION

(75) Inventors: Kazuki Yoshida, Suwa (JP); Yasunori Onishi, Shiojiri (JP); Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 403 days.

(21) Appl. No.: 13/489,668

(22) Filed: Jun. 6, 2012

(65) Prior Publication Data

US 2013/0016067 A1 Jan. 17, 2013

(30) Foreign Application Priority Data

Jul. 15, 2011 (JP) ................................. 2011-156431

(51) Int. Cl.
G06F 3/042 (2006.01)

(52) U.S. Cl.
CPC .................... *G06F 3/0428* (2013.01)

(58) Field of Classification Search
None
See application file for complete search history.

(56) References Cited

U.S. PATENT DOCUMENTS

| | | | | |
|---|---|---|---|---|
| 4,762,990 A * | 8/1988 | Caswell et al. | ................ | 250/221 |
| 6,953,926 B2 | 10/2005 | Reime | | |
| 2005/0078095 A1 * | 4/2005 | Ung et al. | ...................... | 345/175 |
| 2006/0192782 A1 * | 8/2006 | Hildreth | ......................... | 345/473 |
| 2007/0052692 A1 * | 3/2007 | Gruhlke et al. | ................ | 345/175 |
| 2008/0259053 A1 * | 10/2008 | Newton | ......................... | 345/175 |
| 2008/0261693 A1 * | 10/2008 | Zalewski | ......................... | 463/31 |
| 2009/0027357 A1 * | 1/2009 | Morrison | ....................... | 345/175 |
| 2009/0278794 A1 * | 11/2009 | McReynolds et al. | ........ | 345/156 |
| 2010/0091110 A1 * | 4/2010 | Hildreth | ........................ | 348/169 |
| 2010/0201808 A1 * | 8/2010 | Hsu | ................................ | 348/135 |
| 2011/0096032 A1 | 4/2011 | Nakanishi | | |
| 2011/0128554 A1 | 6/2011 | Nakanishi | | |
| 2012/0068974 A1 * | 3/2012 | Ogawa | ........................... | 345/175 |
| 2012/0225718 A1 * | 9/2012 | Zhang | ............................. | 463/31 |
| 2013/0155028 A1 | 6/2013 | Nakanishi | | |

FOREIGN PATENT DOCUMENTS

| | | |
|---|---|---|
| JP | 05-045117 | 2/1993 |
| JP | 2003-534554 | 11/2003 |
| JP | 2006-349555 | 12/2006 |
| JP | 2009-295318 | 12/2009 |
| JP | 2010-127671 | 6/2010 |
| JP | 2010-277122 A | 12/2010 |
| JP | 2011-090605 A | 5/2011 |
| JP | 2011-117750 A | 6/2011 |
| JP | 2012-133487 A | 7/2012 |
| JP | 2012133487 A * | 7/2012 |
| WO | WO-2010-137277 A1 | 12/2010 |

* cited by examiner

*Primary Examiner* — Aneeta Yodichkas
*Assistant Examiner* — Kirk Hermann
(74) *Attorney, Agent, or Firm* — Harness, Dickey & Pierce, P.L.C.

(57) ABSTRACT

In a position detection system, a retroreflection portion is provided on an outer peripheral surface of a designating member. A light source unit emits detection light along an imaginary plane parallel to a reference surface. A light receiving element is arranged on one side in a Z-axis direction from the imaginary surface in such a way that a direction of a normal light to a light receiving surface intersects with the reference surface. When a distance between the designating member and the light source unit is long, light reflected by the retroreflection portion becomes incident more efficiently on the light receiving surface of the light receiving element than when the distance is short.

5 Claims, 15 Drawing Sheets

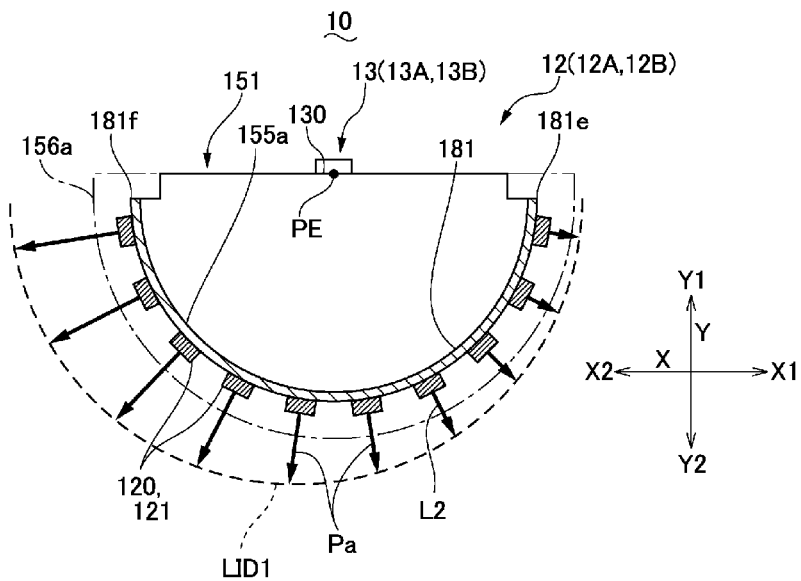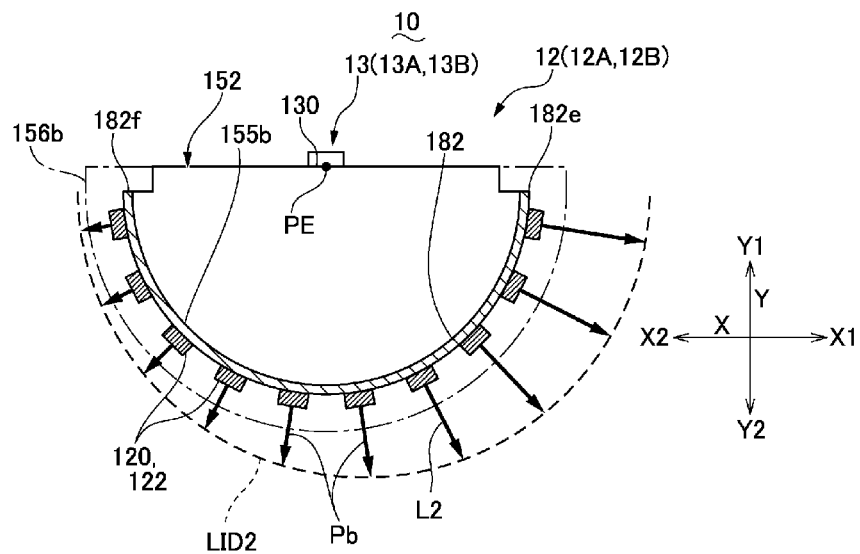

POSITION DETECTION SYSTEM AND DISPLAY SYSTEM WITH INPUT FUNCTION

BACKGROUND

1. Technical Field

The present invention relates to a position detection system for optically detecting the position of a designating member, and a display system with input function including the position detection system.

2. Related Art

As a position detection system for optically detecting the position of a designating member, for example, a system is proposed in which plural light sources are provided at positions away from each other and when detection light is emitted from each of the plural point light sources toward the designating member via a light-transmissive member, the detection light reflected by the designating member is transmitted through the light-transmissive member and is detected by a light receiving element (see JP-T-2003-534554). Another position detection system is proposed in which detection light emitted from each of plural point light sources is emitted via a light guide plate and the detection light reflected by the designating member is detected by a light receiving element (see JP-A-2010-127671 and JP-A-2009-295318).

In such position detection systems, a common light receiving element is used and the position of designating member is detected based on the result of a comparison between a received light intensity at the light receiving element when one or some of the plural point light sources turn on and a received light intensity at the light receiving element when another or some others of the plural point light sources turn on.

However, with the configurations disclosed in JP-T-2003-534554, JP-A-2010-127671 and JP-A-2009-295318, it is difficult to expand the detection range even when two-dimensional coordinate data (for example, X coordinate data and Y coordinate data) of the designating member is to be obtained. That is, if the detection range is broadened, light becomes incident on the light receiving element from a direction that is greatly inclined from the direction of a normal line to a light receiving surface. However, since the light-receiving element is directional in such a way that the sensitivity to oblique directions is low, it is difficult to expand the detection range with the configurations disclosed in JP-T-2003-534554, JP-A-2010-127671 and JP-A-2009-295318. Here, the present inventor is studying a technique of emitting detection light L2 from a light source unit 12 radially along an imaginary plane P12 parallel to a reference surface 41a and then detecting, by a light receiving element 13, reflected light L3 reflected by a designating member Ob, thus detecting the position of the designating member Ob within the reference surface 41a as an angular position about the light source unit 12, as shown in FIG. 15. The inventor is also studying a technique of providing a retroreflection portion Sb on an outer peripheral surface of the designating member Ob and also arranging the light receiving element 13 in such a way that the direction of a normal line L130 to a light receiving surface 130 becomes parallel to the reference surface 41a and the imaginary plane P12, thus causing the reflected light L3 from the designating member Ob to become incident efficiently on the light receiving surface 130.

However, in the configuration shown in FIG. 15, an intensity L of the detection light L2 reaching a position at a distance d from the light source unit 12 is inversely proportional to the square of the distance d, as expressed by the following equation.

$$L = L_0/d^2$$

where $L_0$=exit intensity from the light source unit 12

Therefore, when the distance d between the designating member Ob and the light source unit 12 is short, for example, de, the output level from the light receiving element 13 is sufficiently high. However, when the distance d between the designating member Ob and the light source unit 12 is long, for example, df, the output level from the light receiving element 13 is low and detection accuracy is lowered. Meanwhile, if the exit intensity from the light source unit 12 is increased, when the distance d between the designating member Ob and the light source unit 12 is de, which is short, the output level from the light receiving element 13 is too high and exceeds an allowable input range of a detection circuit.

SUMMARY

An advantage of some aspects of the invention is to provide a position detection system in which an output from the light receiving element can be set at an appropriate level irrespective of the distance between the light source unit and the designating member, and a display system with input function including this position detection system.

An aspect of the invention is directed to a position detection system including: a reference surface prescribed by a first direction and a second direction which are orthogonal to each other; alight source unit which emits detection light radially along an imaginary plane which is set to face the reference surface on one side in a third direction orthogonal to the first direction and the second direction; a designating member having a retroreflection portion on an outer peripheral surface and situated on the one side in the third direction in relation to the reference surface; a light receiving element which receives the detection light reflected by the designating member; and a position detecting unit which detects a position of the designating member in an in-plane direction of the reference surface, based on an output from the light receiving element. The light receiving element is arranged on the one side of the third direction in relation to the reference surface in such a way that a direction of a normal line to a light receiving surface intersects with the reference surface. According to this aspect, since the retroreflection portion is provided on the outer peripheral surface of the designating member, as the detection light emitted from the light source unit is reflected by the designating member, the reflected light travels toward the light source unit and a portion of the reflected light becomes incident on the light receiving surface of the light receiving element. In this case, when the designating member is at a position close to the light source unit, the detection light has a high intensity. However, incidence on the light receiving surface of the light receiving element is in a direction forming a large angle to a direction of retroreflection of the reflected light and therefore incidence efficiency on the light receiving surface is low. On the other hand, when the designating member is at a position distant from the light source unit, the detection light has a low intensity. However, incidence on the light receiving surface of the light receiving element is in a direction forming a small angle to the direction of retroreflection of the reflected light and therefore incidence efficiency on the light receiving surface is high. Also, since the direction of the normal line to the light receiving surface of the light receiving element is inclined to intersect with the reference surface, the angle formed by the light incident on the light receiving surface of the light receiving element and the direction of the normal line to the light receiving surface can be decreased. Therefore, the difference in the level of the signal outputted from the light receiving element between when the designating member is at a position close to the light source unit and when the designating member is at a position distant from the light source unit can be reduced. Moreover, since the direction of the normal line to the light receiving surface is inclined into the direction that intersects with the reference surface, the angle formed by the light incident on the light receiving surface of the light receiving element and the direction of the normal light to the light receiving surface can be decreased. Thus, in both cases where the designating member is at a position close to the light source unit and where the designating member is at a position distant from the light source unit, the level of the signal outputted from the light receiving element is high. Therefore, according to this aspect, an output from the light receiving element can be set at an appropriate level and detection accuracy can be improved, irrespective of the distance between the designating member and the light source unit.

In the position detection system according to the aspect of the invention, it is preferable that the light receiving surface is situated further on the one side in the third direction than the imaginary plane. In such a configuration, when the direction of the normal light to the light receiving surface is inclined into the direction intersecting with the reference surface, the difference in the level of the signal outputted from the light receiving element between when the designating member is at a position close to the light source unit and when the designating member is at a position distant from the light source unit can be reduced. That is, when the designating member is at a position close to the light source unit, the detection light has a high intensity. However, incidence on the light receiving surface of the light receiving element is in a direction that is greatly inclined from the direction of the normal line to the light receiving surface and therefore the sensitivity of the light receiving element is low. On the other hand, when the designating member is at a position distant from the light source unit, the detection light has a low intensity. However, incidence on the light receiving surface of the light receiving element is in a direction that is slightly inclined from the direction of the normal line to the light receiving surface and therefore the sensitivity of the light receiving element is high. Thus, the difference in the level of the signal outputted from the light receiving element between when the designating member is at a position close to the light source unit and when the designating member is at a position distant from the light source unit can be reduced.

In the position detection system according to the aspect of the invention, it is preferable that the imaginary plane is inclined in relation to the reference surface. With this configuration, when the designating member is at a position close to the light source unit, an area of the designating member irradiated with the detection light can be narrowed. When the designating member is at a position distant from the light source unit, an area of the designating member irradiated with the detection light can be broadened. Therefore, the difference in the level of the signal outputted from the light receiving element between when the designating member is at a position close to the light source unit and when the designating member is at a position distant from the light source unit can be reduced.

In the position detection system according to the aspect of the invention, it is preferable that a half-value angle of exit intensity in the third direction of the light source unit is equal to an angle formed by the imaginary plane and the reference surface. With such a configuration, both at a position close to the light source unit and a position distant from the light source, a range at an equal distance from the reference surface can be suitably set as a detection target space.

In the position detection system according to the aspect of the invention, the light source unit may reduce light intensity from one side toward the other side of an exit angle range of the detection light during a first period and reduce light intensity from the other side toward the one side of the exit angle range of the detection light during a second period that does not overlap the first period. The position detecting unit can be configured to detect the position of the designating member in the in-plane direction of the reference surface, based on a result of comparison between an output from the light receiving element during the first period and an output from the light receiving element during the second period.

The position detection system according to the above aspect can be utilized for various systems such as a display system with input function, an input system for electronic paper, a window system with input function, and an amusement system with input function.

For example, another aspect of the invention is directed to a display system with input function including a display device having a display surface within a plane prescribed by a first direction and a second direction which are orthogonal to each other, and a position detection system for detecting a position of a designating member situated on one side in a third direction orthogonal to the display surface, and an image displayed on the display surface is switched based on a result of position detection of the designating member by the position detection system. The designating member has a retroreflection portion on an outer peripheral surface. The position detection system includes a light source unit which emits detection light radially along an imaginary plane which is set to face the display surface on the one side in the third direction, a light receiving element which receives the detection light reflected by the designating member, and a position detecting unit which detects a position of the designating member in an in-plane direction of the display surface, based on an output from the light receiving element. The light receiving element is arranged on the one side of the third direction in relation to the display surface in such a way that a direction of a normal line to a light receiving surface intersects with the display surface.

Still another aspect of the invention is directed to a display system with input function including a screen having a screen surface within a plane prescribed by a first direction and a second direction which are orthogonal to each other, an image projection device which projects an image onto the screen surface, and a position detection system for detecting a position of a designating member situated on one side in a third direction orthogonal to the screen surface, and an image displayed on the screen surface is switched based on a result of position detection of the designating member by the position detection system. The position detection system includes a light source unit which emits detection light radially along an imaginary plane which is set to face the screen surface on the one side in the third direction, a light receiving element which receives the detection light reflected by the designating member, and a position detecting unit which detects a position of the designating member in an in-plane direction of the screen surface, based on an output from the light receiving element. The light receiving element is arranged on the one side of the third direction in relation to the screen surface in such a way that a direction of a normal line to a light receiving surface intersects with the screen surface.

BRIEF DESCRIPTION OF THE DRAWINGS

The invention will be described with reference to the accompanying drawings, wherein like numbers reference like elements.

FIGS. 12A and 12B are explanatory views of a light source unit of the light receiving and emitting unit shown in FIG. 11.

DESCRIPTION OF EXEMPLARY EMBODIMENTS

Figure 1A:
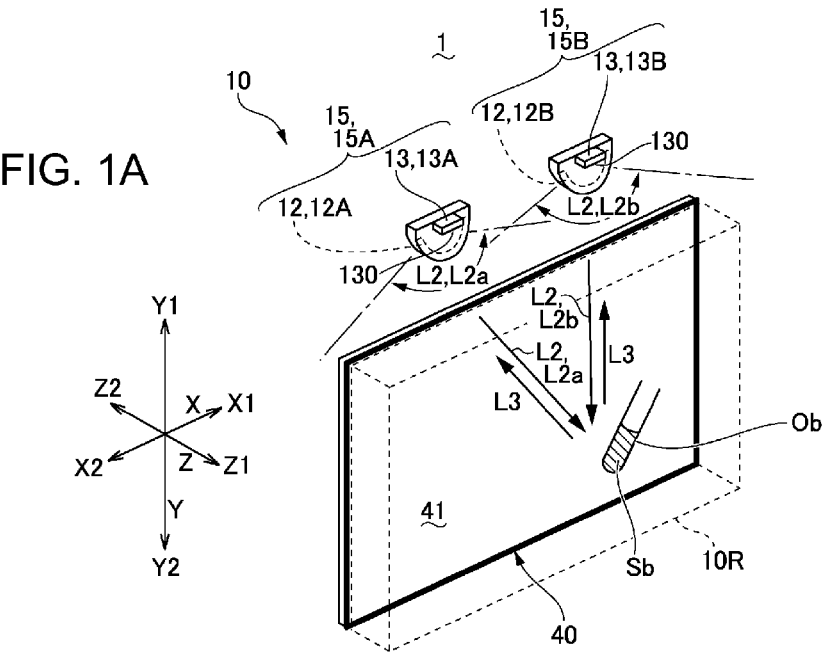
FIGS. 1A and 1B are explanatory views schematically showing main parts of a position detection system according to Embodiment 1 of the invention.

Embodiments of the invention will be described with reference to the accompanying drawings. Hereinafter, the directions which are orthogonal to each other are referred to as an X-axis direction and Y-axis direction. The direction orthogonal to the X-axis direction and Y-axis direction is referred to as a Z-axis direction. Also, it is assumed that the "first direction" used in the invention is the X-axis direction, the "second direction" is the Y-axis direction and the "third direction" is the Z-axis direction. In the drawings referred to below, one side in the X-axis direction is denoted as an X1 side and the other side is denoted as an X2 side. One side in the Y-axis direction is denoted as a Y1 side and the other side is denoted as a Y2 side. One side in the Z-axis direction is denoted as a Z1 side and the other side is denoted as a Z2 side.

Embodiment 1

Overall Configuration

Figure 1B:
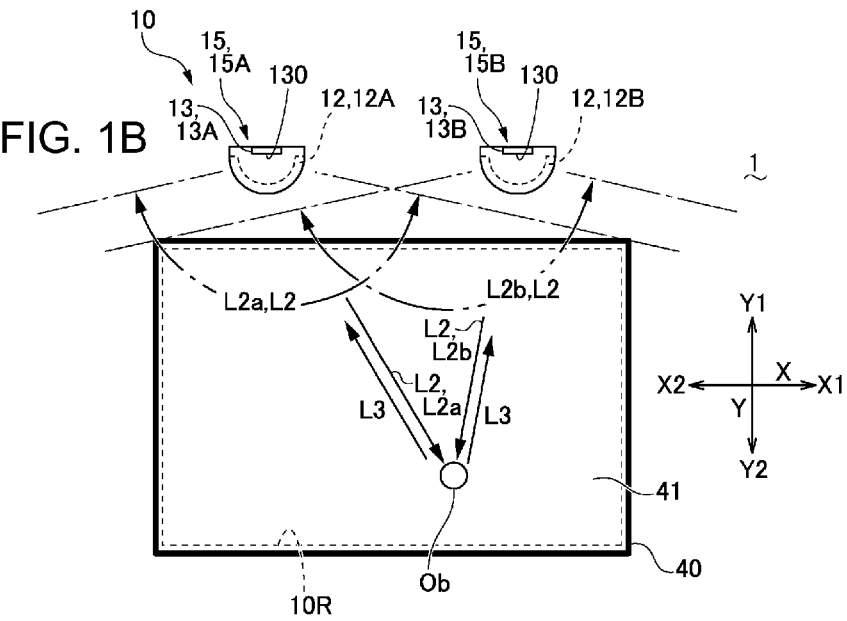

FIGS. 1A and 1B are explanatory views schematically showing main parts of a position detection system according to Embodiment 1 of the invention. FIG. 1A is an explanatory view of the position detection system as viewed from an oblique direction on the side of a detection light exit space. FIG. 1B is an explanatory view of the position detection system as viewed from the front.

In FIGS. 1A and 1B, a position detection system 1 of this embodiment has an optical position detection device 10 which detects the position of a designating member Ob. The optical position detection device 10 detects the position of the designating member Ob, using detection light L2 emitted radially along an imaginary XY plane (imaginary plane) prescribed by the X-axis direction and the Y-axis direction.

In this embodiment, the position detection system 1 has a visual recognition surface forming member 40 including a visual recognition surface 41 which expands along a XY plane on the one side Z1 in the Z-axis direction. The visual recognition surface 41 serves as a reference surface 41a when detecting the position of the designating member Ob.

Thus, the optical position detection device 10 emits the detection light L2 along the visual recognition surface 41 and detects the position of the designating member Ob in an in-plane direction of the reference surface 41a (visual recognition surface 41), in relation to the designating member Ob situated on the side of the visual recognition surface 41 from the visual recognition surface forming member 40 (on the one side Z1 in the Z-axis direction). Therefore, a detection target space 10R of the position detection system 1 is a detection light exit space where the detection light L2 is emitted in the optical position detection device 10. In the detection target space 10R, a light intensity distribution of the detection light L2 is formed, as will be described later. With the optical position detection device 10, the position detection system 1 can be used as a display system with input function or projection-type display system with input function, such as an electronic blackboard, as will be described later.

In this embodiment, the designating member Ob has a retroreflection portion Sb on an outer peripheral surface. The retroreflection portion Sb reflects the detection light L2 back toward the light source along the direction in which the detection light L2 is cast. Therefore, the direction in which the detection light L2 cast on the designating member Ob is reflected is defined irrespective of the position of the designating member Ob. The retroreflection portion Sb is made up of, for example, a resin layer or the like in which plural light-transmissive spheres such as glass beads are fixed. The retroreflection portion Sb has a retroreflective property to reflect incident light back toward the light source along the direction in which the light is made incident irrespective of the angle of incident. More specifically, light which becomes incident on the sphere is reflected back toward the light source along the direction of incidence, by refraction when the light becomes incident on the sphere, reflection in the sphere on the boundary between the sphere and the resin layer, and refraction when the light exits the sphere. Therefore, when the detection light L2 is emitted radially from a light source unit 12, the detection light L2 cast on the designating member Ob is reflected back toward the light source unit 12 by the retroreflection portion Sb of the designating member Ob, no matter what position the designating member Ob is at. The retroreflection portion Sb may be made of an aggregate of hemispherical glass beads or prism fragments or the like.

In the position detection system 1 of this embodiment, the optical position detection device 10 has the light source unit 12 which emits the detection light L2 radially along the visual recognition surface 41 (XY plane), and a light receiving element 13 which receives the detection light L2 (reflected light L3) reflected by the designating member Ob situated in the exit space (detection target space 10R) of the detection light L2. The light receiving element 13 has a light receiving surface 130 facing the detection target space 10R.

In this embodiment, as the light source unit 12, two light source units 12 (first light source unit 12A and second light source unit 12B) situated at positions apart from the visual recognition surface forming member 40 to the one side Y1 in the Y-axis direction and facing the detection target space 10R are used. The first light source unit 12A and the second light source unit 12B are apart from each other in the X-axis direction and at the same position in the Y-axis direction. Also, in this embodiment, as the light receiving element 13, a first light receiving element 13A and a second light receiving element 13B situated at positions apart from the visual recognition surface forming member 40 to the one side Y1 in the Y-axis direction and facing the detection target space 10R are used. The first light receiving element 13A and the second light receiving element 13B are apart from each other in the X-axis direction and at the same position in the Y-axis direction.

Here, the first light receiving element 13A is arranged at a position which overlaps, in the Z-axis direction, a radiation center position of the detection light L2 (detection light L2a) emitted radially from the first light source unit 12A. The first light receiving element 13A and the first light source unit 12A are integrated as a light receiving and emitting unit 15 (first light receiving and emitting unit 15A). Meanwhile, the second light receiving element 13B is arranged at a position which overlaps, in the Z-axis direction, a radiation center position of the detection light L2 (detection light L2b) emitted radially from the second light source unit 12B. The second light receiving element 13B and the second light source unit 12B are integrated as a light receiving and emitting unit 15 (second light receiving and emitting unit 15B).

As will be described later, each of the two light source units 12 (first light source unit 12A and second light source unit 12B) has a light source (point light source) including a light emitting element such as LED (light emitting diode) and emits the detection light L2 (detection light L2a, L2b) made up of infrared rays with a peak wavelength of 840 to 1000 nm, as diverging light. Each of the light receiving elements 13 (first light receiving element 13A and second light receiving element 13B) includes a light receiving element 13 such as photodiode or phototransistor. In this embodiment, the light receiving element 13 is a photodiode having a sensitivity peak in infrared range.

The first light receiving and emitting unit 15A and the second light receiving and emitting unit 15B are situated at positions projecting to the one side Z1 in the Z-axis direction from the visual recognition surface forming member 40. The first light receiving and emitting unit 15A and the second light receiving and emitting unit 15B operate during different periods from each other. Therefore, when the detection light L2a is emitted from the first light source unit 12A in the first light receiving and emitting unit 15A, the first light receiving element 13A receives the detection light L2a (reflected light L3) reflected by the designating member Ob situated in the detection target space 10R. In a different period from this operation, when the detection light L2b is emitted from the second light source unit 12B in the second light receiving and emitting unit 15B, the second light receiving element 13B receives the detection light L2b (reflected light L3) reflected by the designating member Ob situated in the detection target space 10R.

Specific Configuration of Light Source Unit 12

Figure 2:
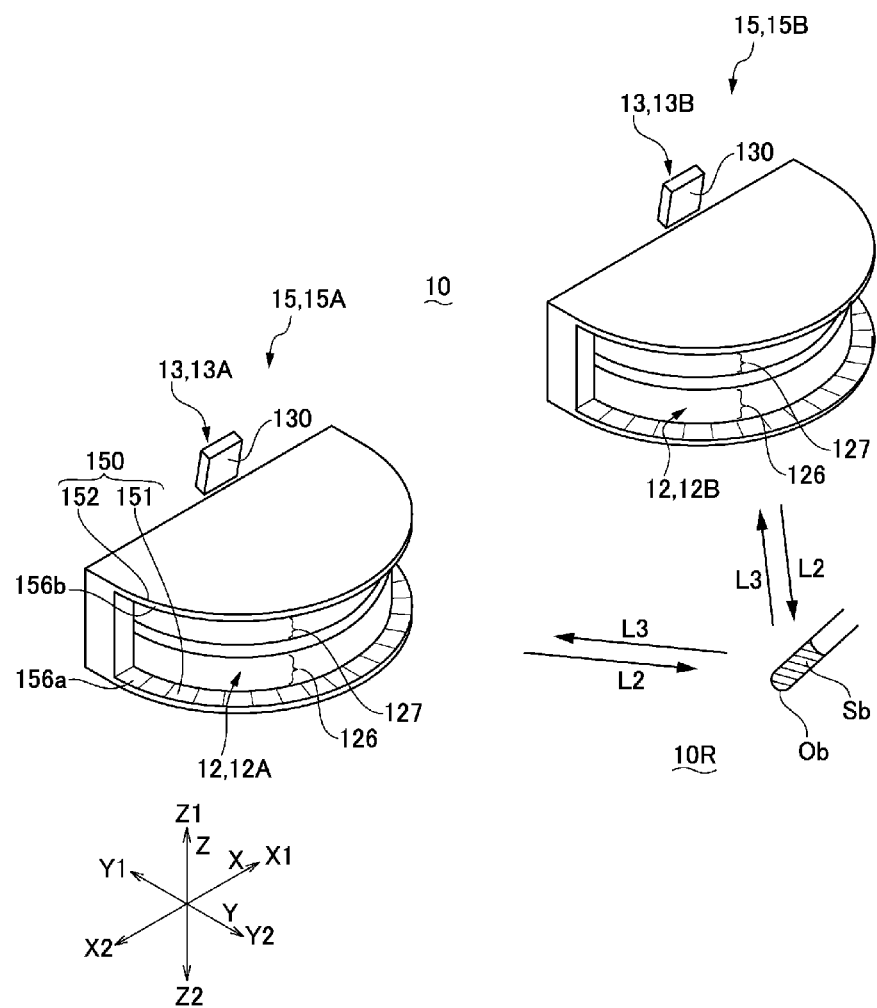
FIG. 2 is an explanatory view of a light receiving and emitting unit of the position detection system according to Embodiment 1 of the invention.
Figure 3:
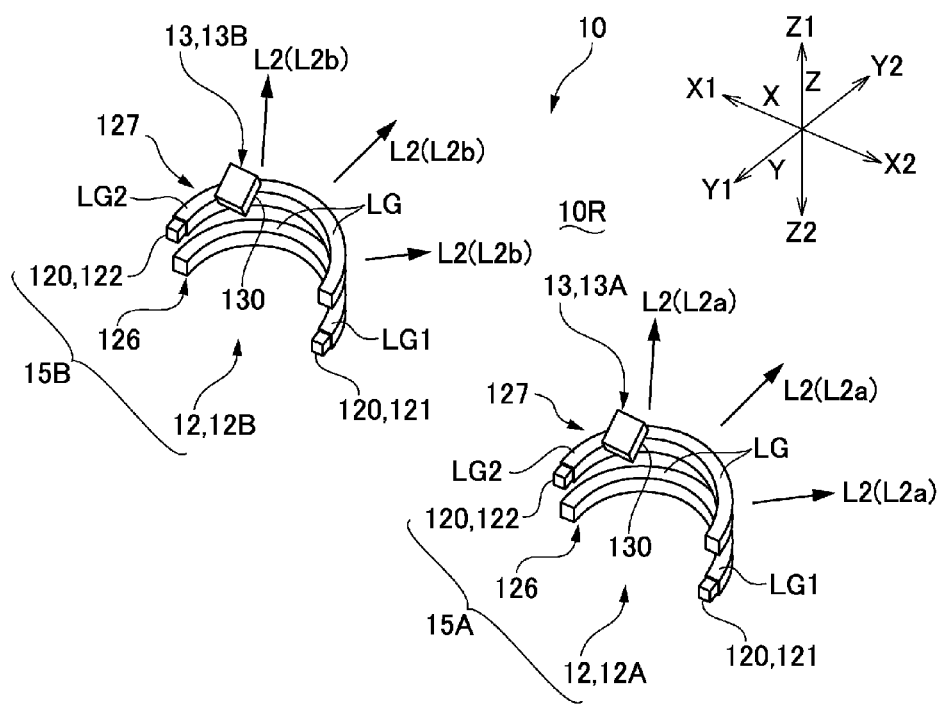
FIG. 3 is an explanatory view showing the configuration of main parts of the light receiving and emitting unit shown in FIG. 2.
Figure 4A:
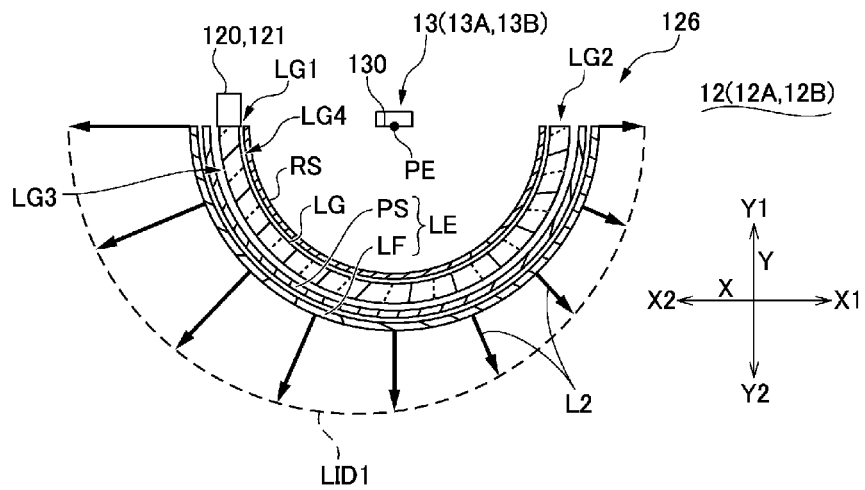
FIGS. 4A and 4B are explanatory views schematically showing the configuration of a light source unit configured in the light receiving and emitting unit shown in FIG. 3.
Figure 4B:
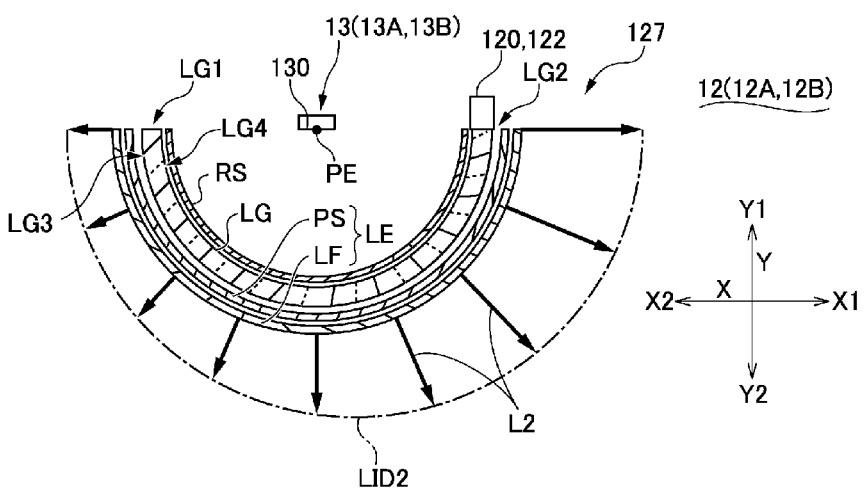

FIG. 2 is an explanatory view of the light receiving and emitting unit of the position detection system 1 according to Embodiment 1 of the invention. FIG. 3 is an explanatory view showing the configuration of main parts of the light receiving and emitting unit shown in FIG. 2. FIGS. 4A and 4B are explanatory views schematically showing the configuration of the light source unit 12 configured in the light receiving and emitting unit shown in FIG. 3. FIG. 4A is an explanatory view showing how the detection light L2 is emitted at the time of a first lighting operation during the first period. FIG. 4B is an explanatory view showing how the detection light L2 is emitted at the time of a second lighting operation during the second period.

As shown in FIG. 2, in the position detection system 1 of this embodiment, the first light receiving and emitting unit 15A and the second light receiving and emitting unit 15B have the same configuration. Therefore, the first light source unit 12A and the second light source unit 12B have the same configuration. More specifically, the first light receiving and emitting unit 15A has a holder 150 which is sectorial as viewed in the Z-axis direction. This holder 150 is structured with a first holder 151 and a second holder 152 which overlap each other in the Z-axis direction. The first holder 151 and the second holder 152 have sectorial flange parts 156a, 156b, respectively. The portion between the flange parts 156a, 156b is an exit portion where the detection light L2 is emitted from the first light source unit 12A. The flange parts 156a, 156b limit the exit range of the detection light L2 in the Z-axis direction.

In the first light receiving and emitting unit 15A, the first light source unit 12A has a first light source module 126 and a second light source module 127 arranged in an overlapping manner in the Z-axis direction, as an emitting part for the detection light L2. The second light receiving and emitting unit 15B has the same configuration as the first light receiving and emitting unit 15A and therefore will not be described further in detail.

As shown in FIG. 3, in the first light receiving and emitting unit 15A, each of the first light source module 126 and the second light source module 127 has a light source 120 including a light emitting element such as a light emitting diode, and an arcuate light guide LG. Also in the second light receiving and emitting unit 15B, as in the first light receiving and emitting unit 15A, each of the first light source module 126 and the second light source module 127 has a light source 120 including a light emitting element such as a light emitting diode, and an arcuate light guide LG.

As shown in FIG. 4A, the first light source module 126 has a first light source 121 including a light emitting element such as a light emitting diode which emits infrared rays, as the light source 120, and also has the arcuate light guide LG. The first light source 121 is arranged at one end part LG1 of the light guide LG. The first light source module 126 also has an arcuate irradiating direction setting part LE having an optical sheet PS and a louver film LF or the like, along an arcuate outer peripheral surface LG3 of the light guide LG. The first light source module 126 has an arcuate reflection sheet RS along an arcuate inner peripheral surface LG4 of the light guide LG. Similarly to the first light source module 126, the second light source module 127 has a second light source 122 including a light emitting element such as a light emitting diode which emits infrared rays, as the light source 120, and also has the arcuate light guide LG. The second light source 122 is arranged at the other end part LG2 of the light guide LG. Similarly to the first light source module 126, the second light source module 127 has an arcuate irradiating direction setting part LE having an optical sheet PS and a louver film LF or the like, along an arcuate outer peripheral surface LG3 of the light guide LG. The second light source module 127 also has an arcuate reflection sheet RS along an arcuate inner peripheral surface LG4 of the light guide LG. At least one of the outer peripheral surface LG3 and the inner peripheral surface LG4 of the light guide LG is worked in order to adjust exit efficiency of the detection light L2 from the light guide LG. As a technique for this working, for example, a technique of printing reflection dots, a molding technique which forms recesses and protrusions by a stamper or by injection, or a groove working technique can be employed. The second light receiving and emitting unit 15B has the same configuration as the first light receiving and emitting unit 15A and therefore will not be described further in detail.

Configuration of Position Detecting Unit or the Like

Figure 5A:
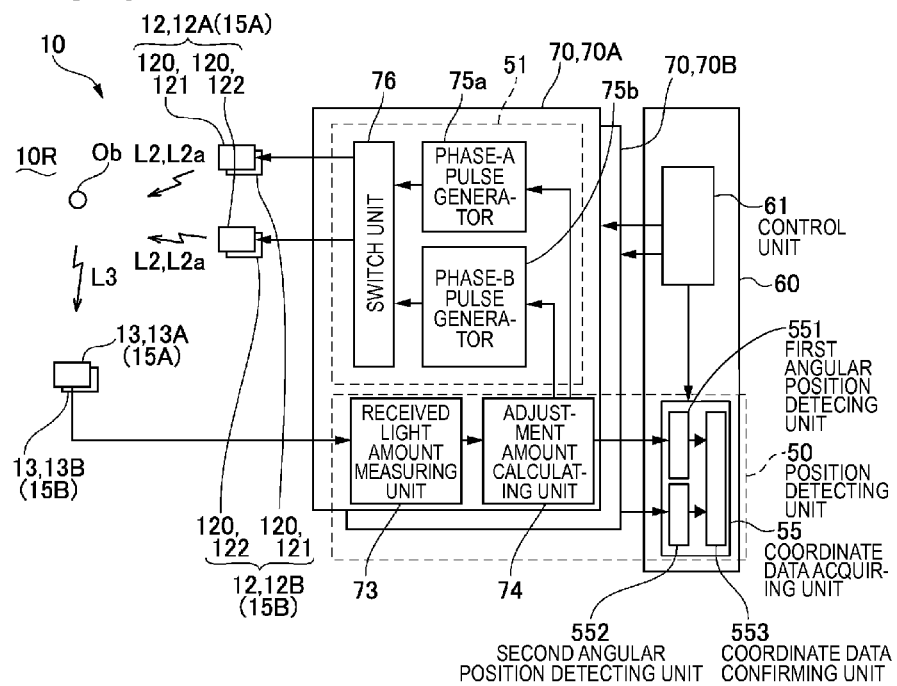
FIGS. 5A and 5B are explanatory views showing the electrical configuration or the like of the position detection system according to Embodiment 1 of the invention.
Figure 5B:
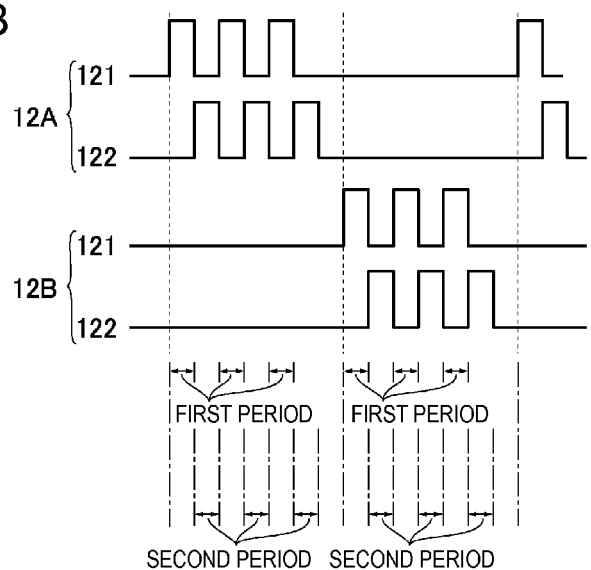

FIGS. 5A and 5B are explanatory views showing the electrical configuration and the like of the position detection system 1 according to Embodiment 1 of the invention. FIG. 5A is an explanatory view showing the configuration of a control IC. FIG. 5B is an explanatory view of a drive signal supplied to the light source.

In the optical position detection device 10 used in the position detection system 1 of this embodiment, the first light receiving and emitting unit 15A and the second light receiving and emitting unit 15B described with reference to FIGS. 1A to 4B or the like are electrically connected to a control IC 70 shown in FIG. 5A. The control IC 70 includes a first control IC 70A electrically connected with the first light receiving and emitting unit 15A and a second control IC 70B electrically connected with the second light receiving and emitting unit 15B. The first light source unit 12A and the first light receiving element 13A of the first light receiving and emitting unit 15A are electrically connected to the first control IC 70A. The second light source unit 12B and the second light receiving element 13B of the second light receiving and emitting unit 15B are electrically connected to the second control IC 70B.

The first control IC 70A and the second control IC 70B have the same configuration and both are electrically connected to a common control device 60. First, the first control IC 70A has plural circuits (not shown) which generate a reference clock, phase-A reference pulse, phase-B reference pulse, timing control pulse, synchronizing clock and the like. The first control IC 70A also has a pulse generator 75a which generates a predetermined drive pulse based on the phase-A reference pulse, a pulse generator 75b which generates a predetermined drive pulse based on the phase-B reference pulse, and a switch unit 76 which controls whether the drive pulses generated by the pulse generator 75a and the pulse generator 75b should be applied to the first light source 121 or the second light source 122 of the first light source unit 12A. The pulse generators 75a, 75b and the switch unit 76 form a light source driving unit 51.

The first control IC 70A also has a received light amount measuring unit 73 having an amplifier or the like which amplifies the result of the detection by the first light receiving element 13A, and an adjustment amount calculating unit 74 which controls the pulse generators 75a, 75b based on the result of the measurement by the received light amount measuring unit 73 and adjusts a drive current value (first drive current value) of the drive pulses supplied to the light source 120 (first light source 121 and second light source 122) of the first light source unit 12A. The received light amount measuring unit 73 and the adjustment amount calculating unit 74 perform a part of the functions of a position detecting unit 50. The adjustment amount calculating unit 74 has an analog-digital converter unit or the like which outputs a control signal to the pulse generators 75a, 75b.

Similarly to the first control IC 70A, the second control IC 70B has a received light amount measuring unit 73 having an amplifier or the like which amplifies the result of the detection by the second light receiving element 13B, and a adjustment amount calculating unit 74 which controls the pulse generators 75a, 75b based on the result of the measurement by the received light amount measuring unit 73 and adjusts a second drive current value supplied to the light source 120 (first light source 121 and second light source 122) of the second light source unit 12B. The received light amount measuring unit 73 and the adjustment amount calculating unit 74 perform a part of the functions of the position detecting unit 50. The first control IC 70A and the second control IC 70B are controlled by a control unit 61 of the control device 60 of higher order such as a personal computer. The control device 60 has a coordinate data acquiring unit 55 which, together with the received light amount measuring unit 73 and the adjustment amount calculating unit 74, forms the position detecting unit 50. Therefore, in this embodiment, the position detecting unit 50 is formed by the received light amount measuring units 73 and the adjustment amount calculating units 74 of the control ICs 70 (first control IC 70A and second control IC 70B), and the coordinate data acquiring unit 55 of the higher-order control device 60 (personal computer).

In this embodiment, the first light source unit 12A and the second light source unit 12B arranged at positions apart from each other are provided as the light source units 12. Therefore, the coordinate data acquiring unit 55 has a first angular position detecting unit 551 which detects an angular position of the designating member Ob in relation to the radiation center of the first light source unit 12A, based on the result of driving the first light source unit 12A, and a second angular position detecting unit 552 which detects an angular position of the designating member Ob in relation to the radiation center of the second light source unit 12B, based on the result of driving the second light source unit 12B. The coordinate data acquiring unit 55 also has a coordinate data confirming unit 553 which confirms XY coordinate data of the designating member Ob, based on the angular position of the designating member Ob acquired by the first angular position detecting unit 551 and the angular position of the designating member Ob acquired by the second angular position detecting unit 552.

In this embodiment, the two control ICs 70 (first control IC 70A, second control IC 70B) are used in a one-to-one relation with the first light receiving and emitting unit 15A and the second light receiving and emitting unit 15B. However, a single multi-channel control IC 70 may be provided to drive the first light receiving and emitting unit 15A and the second light receiving and emitting unit 15B.

In the position detection system 1 configured in this manner, the light source driving unit 51 of the first control IC 70A applies a drive pulse to the first light source 121 of the first light source unit 12A during a first period (first lighting operation) and applies, to the second light source 122 of the first light source unit 12A, a drive pulse with the reverse phase of the drive pulse applied to the first light source 121, during a second period (second lighting operation), as shown in FIG. 5B. Afterwards, the light source driving unit 51 of the second control IC 70B applies a drive pulse to the first light source 121 of the second light source unit 12B during a first period (first lighting operation) and applies, to the second light source 122 of the second light source unit 12B, a drive pulse with the reverse phase of the drive pulse applied to the first light source 121, during a second period (second lighting operation). In the position detection system 1, voltage amplitude modulation and pulse width modulation is carried out in controlling the drive current value to the light source units 12.

Principle of Coordinate Detection

As shown in FIGS. 4A and 4B, in the position detection system 1 of this embodiment, the light source driving unit 51 described with reference to FIG. 5A causes each of the light source units 12 (first light source unit 12A and second light source unit 12B) to carry out the first lighting operation (first period) in which the exit intensity of the detection light L2 decreases from one side toward the other side of a range of radiation angle of the detection light L2, and the second lighting operation (second period) in which the exit intensity of the detection light L2 decreases from the other side toward the one side of the range of radiation angle of the detection light L2.

More specifically, during the first lighting operation (first period), the light source driving unit 51 causes the first light source unit 12A to switch on the first light source 121 of the first light source module 126 and thus emit the detection light L2 into the detection target space 10R. During this period, the second light source 122 is switched off. Consequently, a first light intensity distribution LID1 is formed along the XY plane in the detection target space 10R. This first light intensity distribution LID1 is an intensity distribution in which intensity decreases monotonously from an angular direction corresponding to the one end part LG1 toward an angular direction corresponding to the other end part LG2, as shown in FIG. 4A where the length of the arrow indicates the intensity of exit light.

During the second lighting operation (second period), the light source driving unit 51 causes first light source unit 12A to switch on the second light source 122 of the second light source module 127 and thus emit the detection light L2 into the detection target space 10R. During this period, the first light source 121 is switched off. Consequently, a second light intensity distribution LID2 is formed along the XY plane in the detection target space 10R. This second light intensity distribution LID2 is an intensity distribution in which intensity decreases monotonously from an angular direction corresponding to the other end part LG2 toward an angular direction corresponding to the one end part LG1, as shown in FIG. 4B where the length of the arrow indicates the intensity of exit light.

In the second light source unit 12B, as in the first light source unit 12A, during the first lighting operation in which the first light source 121 of the first light source module 126 is switched on and during the second lighting operation in which the second light source 122 of the second light source module 127 is switched on, a first light intensity distribution LID1 and a second light intensity distribution LID2 are formed. Therefore, as will be described later, using the first light intensity distribution LID1 and the second light intensity distribution LID2, the position of the designating member Ob can be detected since the distances DS of the centers PE of the first light source unit 12A and the second light source unit 12B are fixed (see FIG. 7).

Detection of Angular Position of Designating Member Ob

Figure 6A:
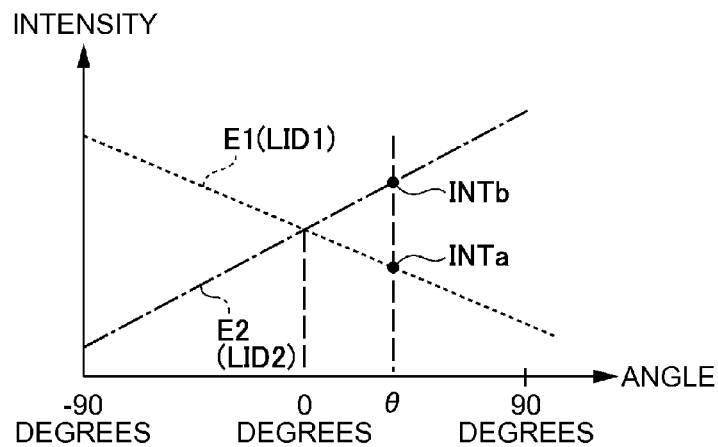
FIGS. 6A and 6B are explanatory views showing a principle of position detection in the position detection system according to Embodiment 1 of the invention.
Figure 6B:
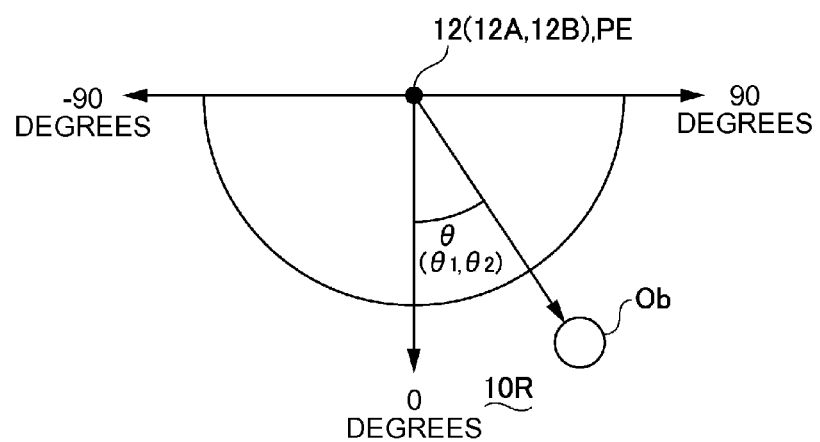
Figure 7:
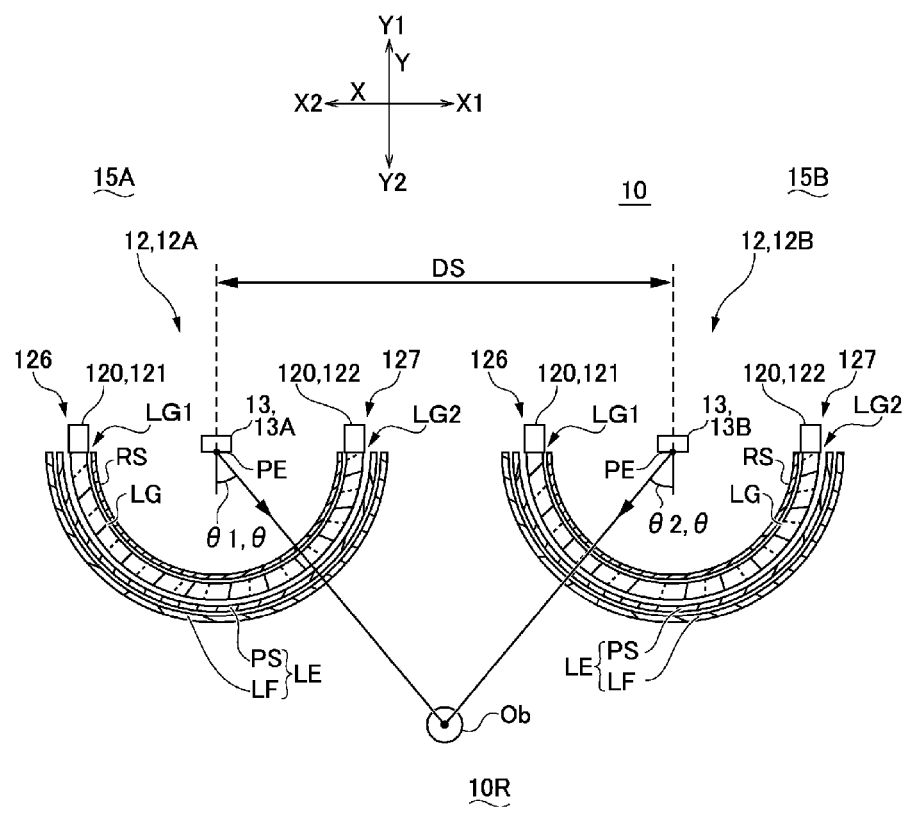
FIG. 7 is an explanatory view showing a principle for acquiring XY coordinate data of a designating member in the position detection system according to Embodiment 1 of the invention.

FIGS. 6A and 6B are explanatory views showing the principle of position detection in the position detection system 1 according to Embodiment 1 of the invention. FIG. 6A is an explanatory view of light intensity distribution. FIG. 6B is an explanatory view of a method for acquiring information of the position (information of the direction) in which the designating member is present. FIG. 7 is an explanatory view showing the principle by which XY coordinate data of the designating member Ob is acquired in the position detection system 1 according to Embodiment 1 of the invention.

First, in the first light source module 126 of the first light source unit 12A, when the first light intensity distribution LID1 is formed, the direction of irradiation of the detection light L2 and the intensity of the detection light L2 are in the linear relationship indicated by the line E1 in FIG. 6A. In the second light source module 127 of the first light source unit 12A, when the second light intensity distribution LID2 is formed, the direction of irradiation of the detection light L2 and the intensity of the detection light L2 are in the linear relationship indicated by the line E2 in FIG. 6A. Here, as shown in FIG. 6B and FIG. 7, the designating member Ob is assumed to be present in the direction of an angle θ, as viewed from the center PE of the first light source unit 12A (the center of the first light source module 126 or the radiation center position of the detection light L2). In this case, when the first light intensity distribution LID1 is formed, the intensity of the detection light L2 at the position where the designating member Ob is present is INTa. Meanwhile, when the second light intensity distribution LID2 is formed, the intensity of the detection light L2 at the position where the designating member Ob is present is INTb. Therefore, by comparing the detected intensity at the first light receiving element 13A when the first light intensity distribution LID1 is formed and the detected intensity at the first light receiving element 13A when the second light intensity distribution LID2 is formed and thus finding the relationship between the intensities INTa and INTb, the angle θ (angle θ1 or angular position) in the direction in which the designating member Ob is situated as viewed from the center PE of the first light source unit 12A can be found, as shown in FIG. 6B and FIG. 7.

In this embodiment, when detecting the angular position (angle θ1) of the designating member Ob using this principle, in the first light source unit 12A, the first drive current value to the first light source 121 and the second drive current value to the second light source 122 are adjusted so that the detected intensity at the first light receiving element 13A when the first light intensity distribution LID1 is formed by the first light source module 126 and the detected intensity at the first light receiving element 13A when the second light intensity distribution LID2 is formed by the second light source module 127 become equal. Here, the exit intensity of the detection light L2 from the first light source unit 12A is proportional to the first drive current value to the first light source 121 and the second drive current value to the second light source 122. Therefore, the angle θ (angle θ1) of the direction in which the designating member Ob is present can be found, based on the ratio or difference between the first drive current value and the second drive current value after the first drive current value to the first light source 121 and the second drive current value to the second light source 122 are adjusted, or based on the ratio or difference in adjustment amount when the drive current values are adjusted.

More specifically, first, the light source driving unit 51 of the first control IC 70A shown in FIG. 5A causes the first light source 121 to be switched on to form the first light intensity distribution LID1 as the first lighting operation, and subsequently causes the second light source 122 to be switched on to form the second light intensity distribution LID2 as the second lighting operation. In this case, the first light intensity distribution LID1 and the second light intensity distribution LID2 have the same intensity level though the two distributions show intensity changes in the opposite directions. The adjustment amount calculating unit 74 of the position detecting unit 50 shown in FIG. 5A compares the received light intensity INTa at the first light receiving element 13A in the first lighting operation with the received light intensity INTb at the first light receiving element 13A in the second lighting operation. If the received light intensity INTa at the first light receiving element 13A in the first lighting operation and the received light intensity INTb at the first light receiving element 13A in the second lighting operation are equal as a result, the angular position of the designating member Ob is 0 degrees.

Meanwhile, when the received light intensities INTa, INTb are different from each other, the first drive current value to the first light source 121 and the second drive current value to the second light source 122 are adjusted so that the received light intensity INTa at the first light receiving element 13A in the first lighting operation and the received light intensity INTb at the first light receiving element 13A in the second lighting operation become equal. Then, as the first lighting operation and the second lighting operation are carried out again, if the received light intensity INTa at the first light receiving element 13A in the first lighting operation and the received light intensity INTb at the first light receiving element 13A in the second lighting operation are equal, the first angular position detecting unit 551 shown in FIG. 5A can find the angle θ (angle θ1) of the direction in which the designating member Ob is present, based on the ratio or difference between the drive current values to the first light source 121 and the second light source 122 after this adjustment is made, or based on the ratio or difference between the adjustment amounts of the drive current values. As such an operation is also carried out in the second light source unit 12B, the second angular position detecting unit 552 shown in FIG. 5A can find the angle θ (angle θ2 or angular position) of the direction in which the designating member Ob is present as viewed from the center PE of the second light source unit 12B. Therefore, the coordinate data confirming unit 553 shown in FIG. 5A can acquire a position equivalent of the point of intersection between the angular position detected by the first angular position detecting unit 551 (direction of the angle θ1) and the angular position detected by the second angular position detecting unit 552 (direction of the angle θ2), as XY coordinate data at which the designating member Ob is situated.

Configuration of Light Receiving Element 13

Figure 8A:
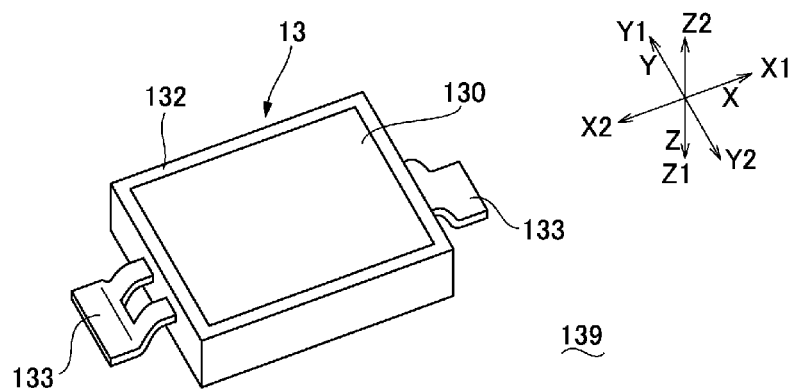
FIGS. 8A and 8B are explanatory views of light receiving element used in the position detection system according to Embodiment 1 of the invention.
Figure 8B:
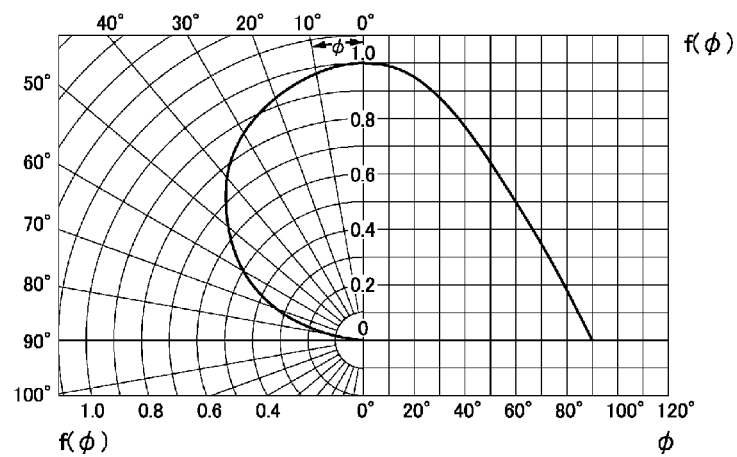

FIGS. 8A and 8B are explanatory views of the light receiving element 13 used in the position detection system 1 according to Embodiment 1 of the invention. FIG. 8A is an explanatory view of the light receiving element 13. FIG. 8B is a graph showing the sensitivity and directionality of the light receiving element 13.

In the position detection system 1 of this embodiment, the light receiving element 13 is made up of a photodiode as shown in FIG. 8A. The light receiving element 13 has an element body 132 in the shape of a rectangular parallelepiped as a whole, and a terminal 133 protruding from both end surfaces in the X-axis direction of the element body 132. The element body 132 has the light receiving surface 130 on one side. The light receiving sensitivity of the light receiving element 13 has incident angle dependency (sensitivity and directionality) as shown in FIG. 8B. The direction of sensitivity peak is in the direction of a normal line to the light receiving surface 130. As can be seen from FIG. 8B, when the incident angle of the detection light L2 is inclined 60 degree or more from the direction of the normal line to the light receiving surface 130, the sensitivity of the light receiving element 13 becomes less than half the sensitivity peak value and therefore becomes very low. Moreover, when the incident angle of the detection light L2 is inclined 90 degrees or more from the direction of the normal line to the light receiving surface 130, the sensitivity of the light receiving element 13 becomes zero. In this embodiment, as will be described below with reference to FIG. 9, the output from the light receiving element 13 is set at an appropriate level irrespective of the distance between the designating member Ob and the light source unit 12, utilizing the retroreflection portion Sb provided on the outer peripheral surface of the designating member Ob, the layout of the light receiving element 13, the direction of the light receiving element 13 and the sensitivity and directionality of the light receiving element 13.

Direction or the Like of Light Receiving Element 13

Figure 9:
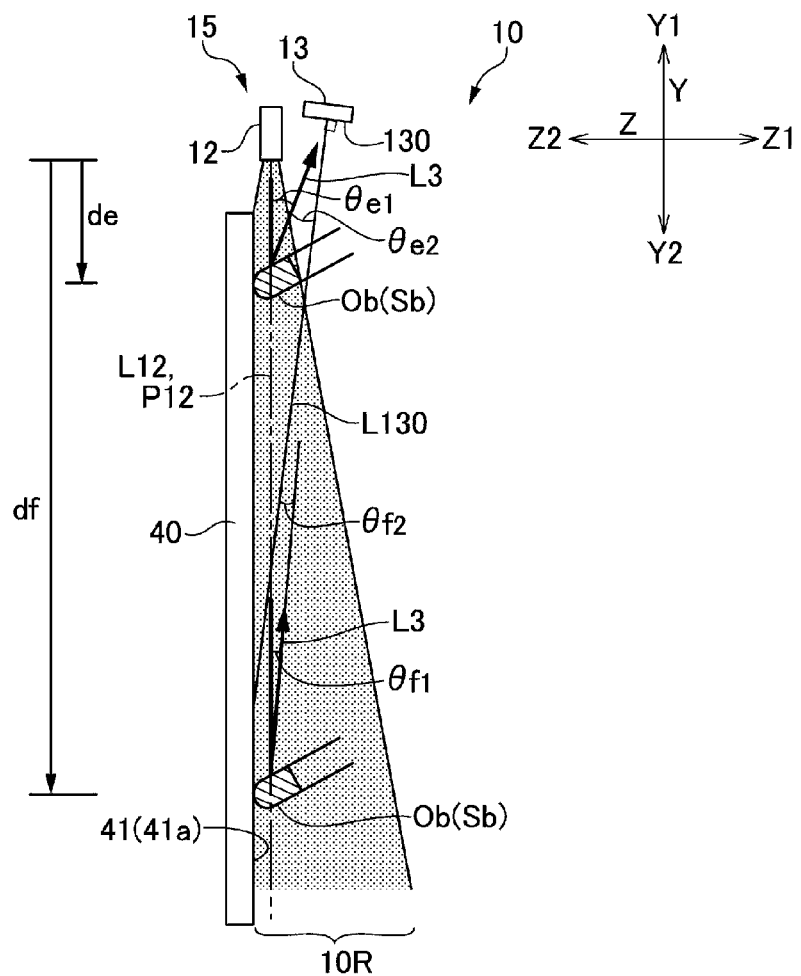
FIG. 9 is an explanatory view of the direction or the like of the light receiving element of the position detection system according to Embodiment 1 of the invention.

FIG. 9 is an explanatory view of the direction or the like of the light receiving element 13 of the position detection system 1 according to Embodiment 1, and is equivalent to a YZ section of the position detection system 1.

As shown in FIG. 9, in the position detection system 1 of this embodiment, an optical axis L12 of the light source unit 12 extends parallel to the reference surface 41a, on the one side Z1 in the Z-axis direction from to the reference surface 41a (visual recognition surface 41 of the visual recognition surface forming member 40). The light source unit 12 emits the detection light L2 along an imaginary plane P12 that is parallel to the reference surface 41a.

In this embodiment, the light receiving element 13 is arranged on the one side Z1 in the Z-axis direction from the imaginary plane P12 in such a way that the direction of the normal line L130 to the light receiving surface 130 intersects with the reference surface 41a.

In the position detection system 1 configured in this manner, as the light source unit 12 radially emits the detection light L2 to the imaginary plane P12 that is parallel to the reference surface 41a, the light (reflected light L3) reflected by the retroreflection portion Sb of the designating member Ob is reflected toward the light source unit 12 and a part of the reflected light becomes incident on the light receiving element 13.

Here, an intensity L of the detection light L2 reaching a position at a distance d from the light source unit 12 is inversely proportional to the square of the distance d, as expressed by the following equation.

$$L=L_0/d^2$$

where $L_0$=exit intensity from the light source unit 12

Therefore, when the distance d between the designating member Ob and the light source unit 12 is a short distance de, the intensity of the detection light L2 is high. When the distance d between the designating member Ob and the light source unit 12 is a long distance df, the intensity of the detection light L2 is low.

However, when the designating member Ob is at a position close to the light source unit 12, incidence on the light receiving surface 130 of the light receiving element 13 is in a direction forming a large angle θe1 to the direction of retroreflection of the reflected light L3 and therefore incidence efficiency on the light receiving surface 130 is low. For example, the rate of light that is reflected toward the light receiving element 13 and becomes incident on the light receiving surface 130 is 50% of the reflected light L3.

Meanwhile, when the designating member Ob is at a position distant from the light source unit 12, incidence on the light receiving surface 130 of the light receiving element 13 is in a direction forming a small angle θf1 to the direction of retroreflection of the reflected light L3 and therefore incidence efficiency on the light receiving surface is high. For example, the rate of light that is reflected toward the light receiving element 13 and becomes incident on the light receiving surface 130 is 75% of the reflected light L3.

Thus, the difference in the level of the signal outputted from the light receiving element 13 between when the designating member Ob is at a position close to the light source unit 12 and when the designating member Ob is at a position distant from the light source unit 12 can be reduced.

Also, in this embodiment, since the direction of the normal line L130 to the light receiving surface 130 of the light receiving element 13 is inclined to intersect with the reference surface 41a, the angle formed by incident light on the light receiving surface 130 of the light receiving element 13 and the direction of the normal line L130 to the light receiving surface 130 can be reduced. Therefore, since the sensitivity of the light receiving element 13 is high, the level of the signal outputted from the light receiving element 13 is high.

Moreover, when the designating member Ob is at a position close to the light source unit 12, incidence on the light receiving surface 130 of the light receiving element 13 is in a direction forming a large angle θe2 to the direction of the normal line L130 to the light receiving surface 130 of the light receiving element 13. In such a direction, the sensitivity of the light receiving element 13 is low. Meanwhile, when the designating member Ob is at a position distant from the light source unit 12, incidence on the light receiving surface 130 of the light receiving element 13 is in a direction forming a small angle θf2 to the direction of the normal line L130 to the light receiving surface 130 of the light receiving element 13. In such a direction, the sensitivity of the light receiving element 13 is high. Therefore, the difference in the level of the signal outputted from the light receiving element 13 between when the designating member Ob is at a position close to the light source unit 12 and when the designating member Ob is at a position distant from the light source unit 12 can be reduced.
Principal Effects of this Embodiment As described above, in the position detection system 1 of this embodiment, the light source unit 12 radially emits the detection light L2 and forms a light intensity distribution (first light intensity distribution LID1 and second light intensity distribution LID2) in which intensity changes from one side toward the other side of the range of radiation angle of the detection light L2. The light receiving element 13 receives the detection light L2 reflected by the designating member Ob situated in the detection target space 10R in which the light intensity distribution is formed. Here, the intensity of the detection light L2 reflected by the designating member Ob is proportional to the intensity at the position where the designating member Ob is situated in the light intensity distribution. The received light intensity at the light receiving element 13 corresponds to the position of the designating member Ob. Therefore, the position detecting unit 50 can detects the position of the designating member Ob, based on the received light intensity at the light receiving element 13. According to this technique, since the light intensity distribution of the detection light L2 that is radially emitted from the light source unit 12 is utilized, a light intensity distribution over a wide space can be formed and the detection target space 10R can be broad.

Also, in this embodiment, as described with reference to FIG. 9, the difference in the level of the signal outputted from the light receiving element 13 between when the designating member Ob is at a position close to the light source unit 12 and when the designating member Ob is at a position distant from the light source unit 12 is small and the level of the signal outputted from the light receiving element 13 is high. Therefore, according to this embodiment, as the allowable input range at the position detecting unit 50 can be narrowed, resolution can be enhanced accordingly and detection accuracy can be improved.

Embodiment 2

Figure 10:
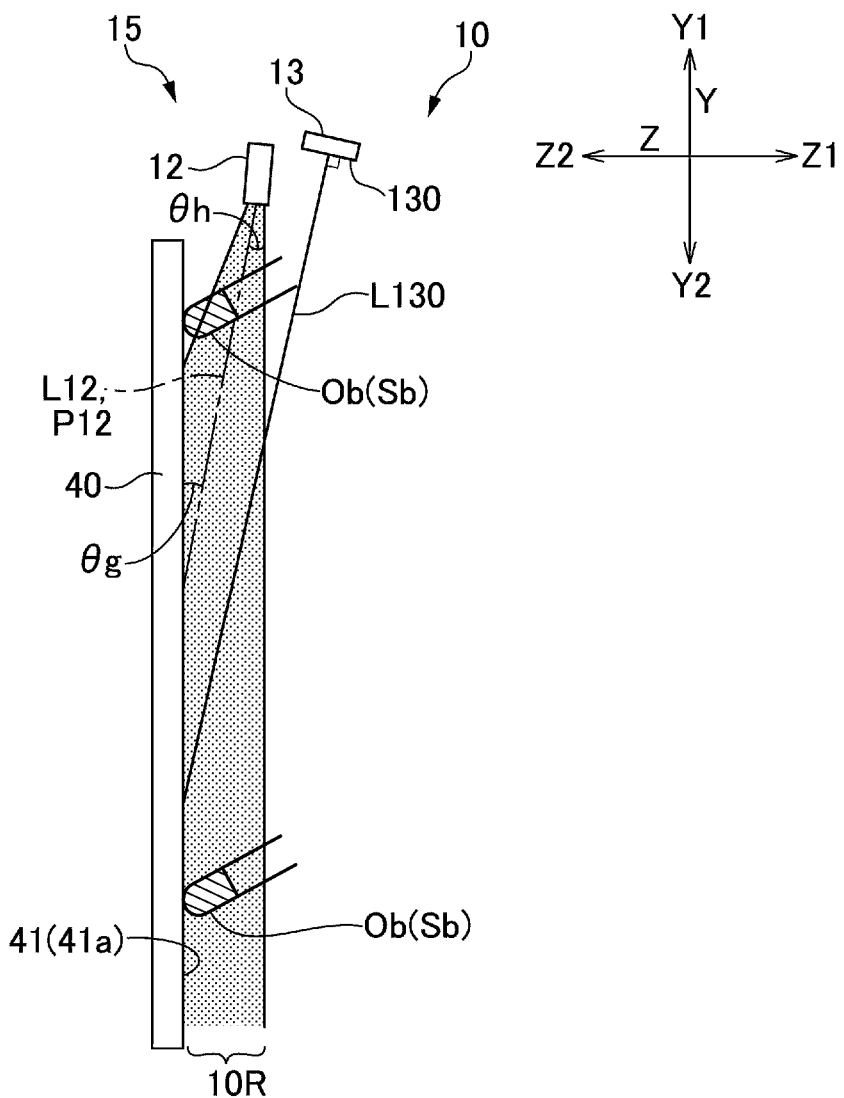
FIG. 10 is an explanatory view of the direction or the like of a light receiving element of a position detection system according to Embodiment 2 of the invention.

FIG. 10 is an explanatory view of the direction or the like of the light receiving element 13 of the position detection system 1 according to Embodiment 2 of the invention, and is equivalent to a YZ section of the position detection system 1. The fundamental configuration of this embodiment is similar to Embodiment 1. Therefore, the same parts are denoted by the same reference numerals and will not be described further in detail.

As shown in FIG. 10, in the position detection system 1 of this embodiment, the optical axis L12 of the light source unit 12 is inclined from the reference surface 41a (visual recognition surface 41 of the visual recognition surface forming member 40). The light source unit 12 emits the detection light L2 along the imaginary plane P12 inclined at an intersection angle θg from the reference surface 41a. The light receiving element 13 is arranged on the one side Z1 in the Z-axis direction from the imaginary plane P12 in such a way that the direction of the normal light L130 to the light receiving surface 130 intersects with the reference surface 41a.

Here, a half-value angle θh of the exit intensity in the Z-axis direction of the light source unit 12 is equal to an angle θg formed by the imaginary plane P12 and the reference surface 41a. Therefore, both at a position close to the light source unit 12 and a position distant from the light source 12, a range at an equal distance from the reference surface 41a can be suitably set as the detection target space 10R.

In this embodiment, since the optical axis L12 (imaginary plane P12) of the light source unit 12 is inclined from the reference surface 41a (visual recognition surface 41 of the visual recognition surface forming member 40), a range that is not irradiated with the detection light L2 is generated on the designating member Ob when the designating member Ob is at a position close to the light source unit 12. Therefore, when the designating member Ob is at a position close to the light source unit 12, the area irradiated with the detection light L2 is narrow. When the designating member Ob is at a position distant from the light source unit 12, the area irradiated with the detection light L2 is broad. Thus, the difference in the level of the signal outputted from the light receiving element 13 between when the designating member Ob is at a position close to the light source unit 12 and when the designating member Ob is at a position distant from the light source unit 12 can be reduced. The other parts of the configuration are similar to Embodiment 1 and therefore will not be described further in detail.

Modification of Embodiments 1 and 2

In the above Embodiments 1 and 2, the light source 120 is provided in each of the two light guides LG. However, the light source 120 may be provided at both ends of one light guide LG and the light sources 120 may be switched on alternately, thus forming light intensity distributions of the opposite directions to each other during the first period and the second period.

Embodiment 3

Figure 11:
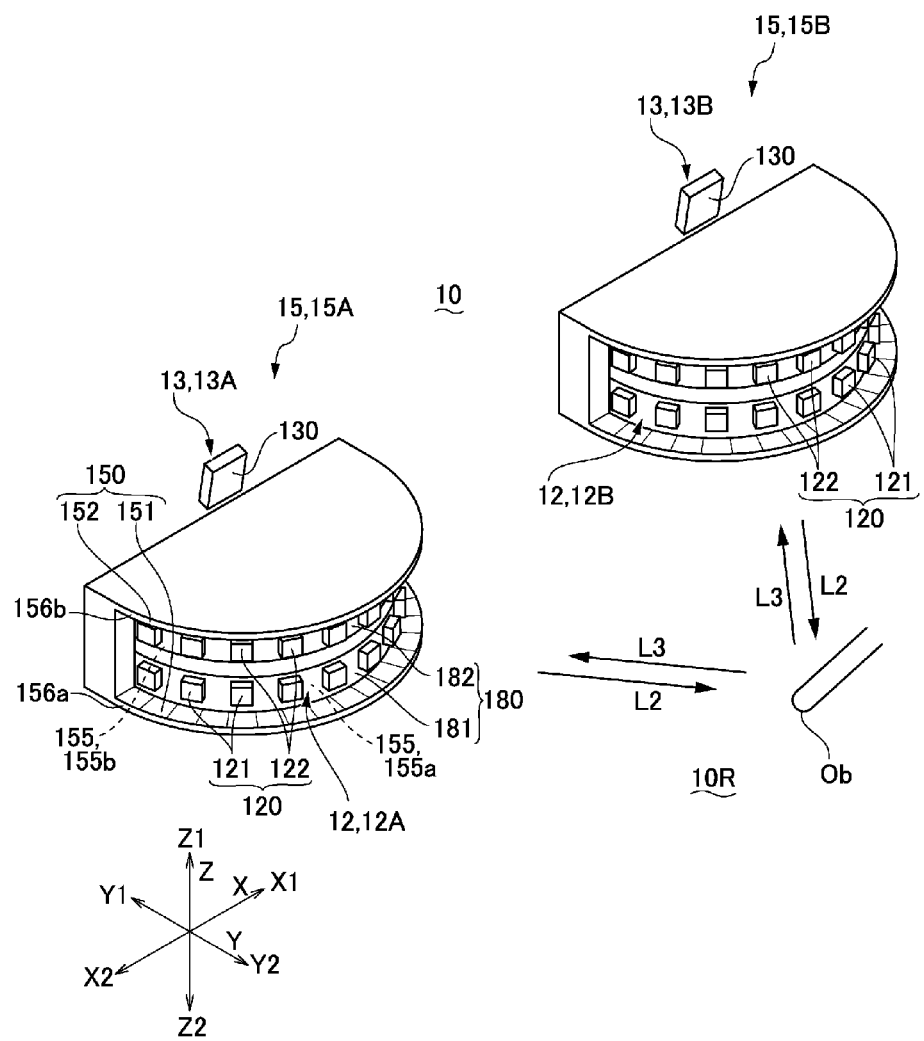
FIG. 11 is an explanatory view of a light receiving and emitting unit of a position detection system according to Embodiment 3 of the invention.

FIG. 11 is an explanatory view of a light receiving and emitting unit of the position detection system 1 according to Embodiment 3 of the invention. FIGS. 12A and 12B are explanatory views of the light source unit in the light receiving and emitting unit shown in FIG. 11. FIG. 12A is an explanatory view showing how the detection light L2 is emitted at the time of the first lighting operation during the first period. FIG. 12B is an explanatory view showing how the detection light L2 is emitted at the time of the second lighting operation during the second period.

In Embodiment 1, the light guide LG is used in the light source unit 12. However, in this embodiment, XY coordinates of the designating member Ob are detected by the principle similar to Embodiment 1, without using any light guide. More specifically, as shown in FIG. 11, each of the light source units 12 (first light source unit 12A and second light source unit 12B) in the position detection system 1 of this embodiment has plural light sources 120 (first light sources 121 and second light sources 122), a band-shaped flexible board 180 on which the plural light sources 120 are mounted, and the sectorial holder 150 having a convexly curved surface 155 extending in a curved shape in the direction of length (circumferential direction). In this embodiment, the convexly curved surface 155 is in an arcuately curved shape in the direction of the length thereof (circumferential direction).

In this embodiment, as the flexible board 180, a band-shaped first flexible board 181 (first light source module) and a band-shaped second flexible board 182 (second light source module) parallel to the first flexible board 181 in the direction of width (Z-axis direction) are used. On the first flexible board 181, the plural first light sources 121 are mounted as the plural light sources 120 in the direction of the length of the first flexible board 181. On the second flexible board 182, the plural second light sources 122 are mounted as the plural light sources 120 in the direction of the length of the second flexible board 182. An LED is used for each of the light sources 120.

In each of the two light source units 12 (first light source unit 12A and second light source unit 12B), the holder 150 is structure with the first holder 151 and the second holder 152 overlapping each other in the Z-axis direction. The first holder 151 and the second holder 152 are configured symmetrically to each other in the Z-axis direction. The first holder 151 has an arcuate convexly curved surface 155a forming a bottom half part of the convexly curved surface 155, and a sectorial flange part 156a protruding from the convexly curved surface 155a at an end that is opposite to the side where the second holder 152 is situated on the convexly curved surface 155a. The first flexible board 181 is superimposed on the convexly curved surface 155a. The second holder 152 has an arcuate convexly curved surface 155b forming a top half part of the convexly curved surface 155, and a sectorial flange part 156b protruding from the convexly curved surface 155b at an end that is opposite to the side where the first holder 151 is situated on the convexly curved surface 155b. The second flexible board 182 is superimposed on the convexly curved surface 155b.

In the position detection system 1 configured in this manner, in order to detect the position of the designating member Ob in the detection target space 10R, the plural first light sources 121 mounted on the first flexible board 181 and the plural second light sources 122 mounted on the second flexible board 182 are switched on during different periods from each other. In this case, in the first lighting operation (first period) in which all the plural first light sources 121 are switched on and all the plural second light sources 122 are switched off, the exit intensity of the first light sources 121 is decreased from the side where an end part 181f on one side in the direction of the length of the first flexible board 181 is situated, toward the side where an end part 181e on the other side is situated, as shown in FIG. 12A where arrows Pa indicate increase and decrease in the exit intensity. Therefore, in the first light intensity distribution LID1 of the detection light L2 emitted into the detection target space 10R, light intensity is high in the angular direction in which the end part 181f on the one side in the direction of the length of the first flexible board 181 is situated. From there, the light intensity continuously decreases into the direction where the end part 181e on the other side is situated. Meanwhile, in the second lighting operation (second period) in which all the plural second light sources 122 are switched on and all the plural first light sources 121 are switched off, the exit intensity of the second light sources 122 is increased from the side where an end part 182f on one side in the direction of the length of the second flexible board 182 is situated, toward the side where an end part 182e on the other side is situated, as shown in FIG. 12B where arrows Pb indicate increase and decrease in the exit intensity. Therefore, in the second light intensity distribution LID2 of the detection light L2 emitted into the detection target space 10R, light intensity is high in the angular direction in which the end part 182e on the other side in the direction of the length of the second flexible board 182 is situated. From there, the light intensity continuously decreases into the direction where the end part 182f on the one side is situated.

Thus, if the first lighting operation and the second lighting operation are executed in each of the first light source unit 12A and the second light source unit 12B, the position (XY coordinates) of the designating member Ob can be detected by a principle similar to Embodiment 1. In this case, the angular position of the designating member Ob can be detected based on the sum of drive currents supplied the plural first light sources 121 (first drive current value) and the sum of drive currents supplied to the plural second light sources 122 (second drive current value). To change the exit intensity of the plural light sources 120, the drive current may be changed for each light source 120 by a resistance element or the like.

Modification of Embodiment 3

In the above Embodiment 2, the two series of light sources 120 are provided. However, a single series of light sources 120 may be provided and the increase and decrease pattern of the drive current supplied to the plural light sources 120 may be reversed between the first period and the second period, thus forming light intensity distributions of the opposite directions to each other during the first period and the second period.

Other Embodiments

In the above embodiments, the two light receiving and emitting units 15 are used. However, the invention may also be applied to a case where one light receiving and emitting unit 15 is used to detect the position of the designating member Ob. Alternatively, the invention may be applied to a case where three or more light receiving and emitting units 15 are used to detect the position of the designating member Ob. In the above embodiments, the light receiving element 13 and the light source unit 12 form the light receiving and emitting unit 15. However, the invention may also be applied to a case where the light receiving element 13 and the light source unit 12 are configured as separate bodies.

Example of Configuration of Position Detection System

Specific Example 1 of Position Detection System 1

Figure 13:
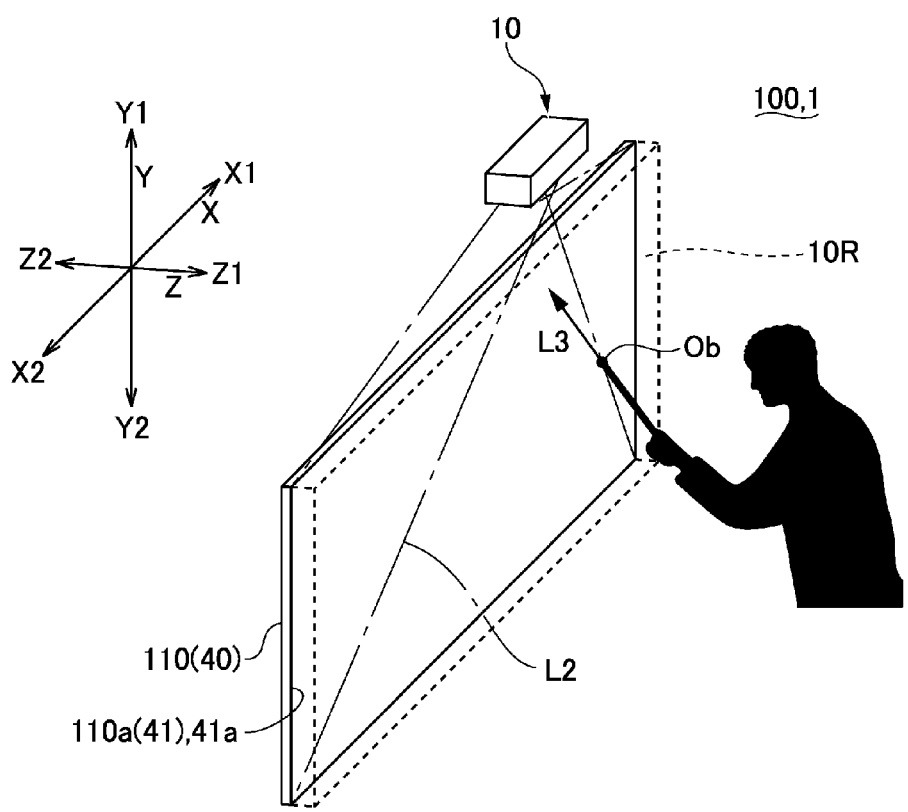
FIG. 13 is an explanatory view of Specific Example 1 of a position detection system to which the invention is applied (a display system with input function).

FIG. 13 is an explanatory view of Specific Example 1 of the position detection system 1 to which the invention is applied (a display system with input function). In the display system with input function of this embodiment, the position detection system 1 and the configuration of the position detection system 1 are similar to the configurations described with reference to FIGS. 1A to 12B. Therefore, the same parts are denoted by the same reference numerals and will not be described further in detail.

If a display device 110 is used as the visual recognition surface forming member 40 in the position detection system 1 according to the above embodiments, as shown in FIG. 13, and the display device 110 is provided with the position detection system 1 described with reference to FIGS. 1A to 12B, the whole system can be used as a display system with input function 100 such as an electronic blackboard or digital signage. Here the display device 110 (display unit) is a direct-view display device or a rear projection display device using the visual recognition surface forming member 40 as a screen.

In this display system with input function 100, the position detection system 1 emits the detection light L2 along a display surface 110a (visual recognition surface 41 or reference surface 41a) and detects the detection light L2 (reflected light L3) reflected by the designating member Ob. Therefore, when the designating member Ob is brought closer to a portion of an image displayed by the display device 110, the position of the designating member Ob can be detected and therefore the position of the designating member Ob can be used as input information such as an image switching instruction.

Specific Example 2 of Position Detection System 1

Figure 14:
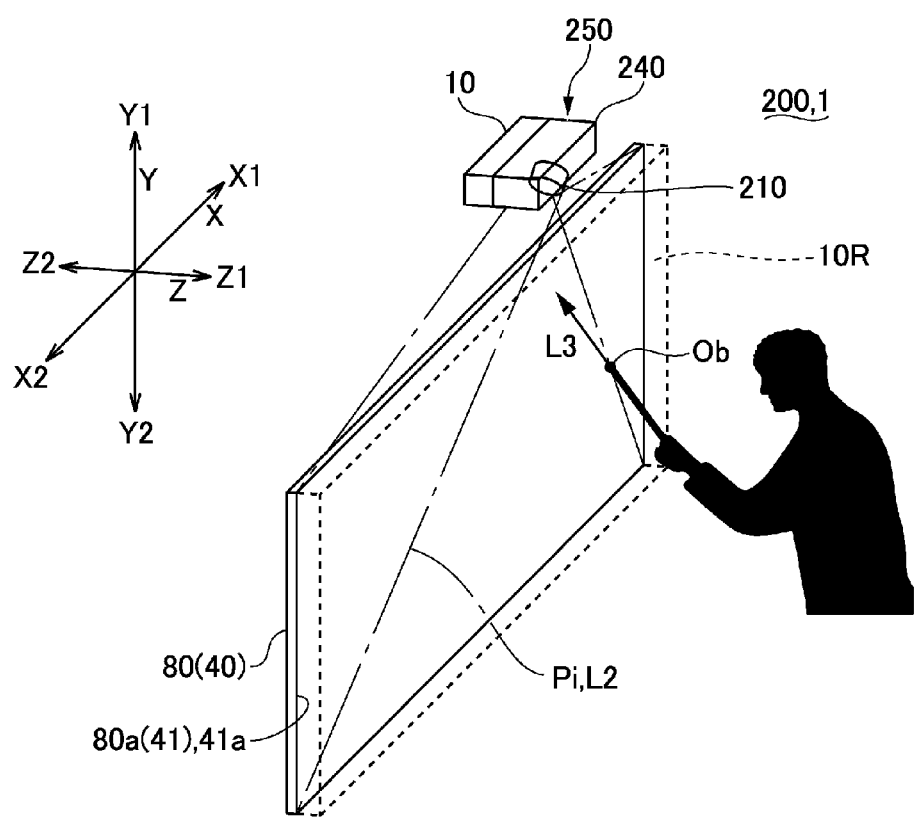
FIG. 14 is an explanatory view of Specific Example 2 of a position detection system to which the invention is applied (a display system with input function or a projection-type display system with input function).
Figure 15:
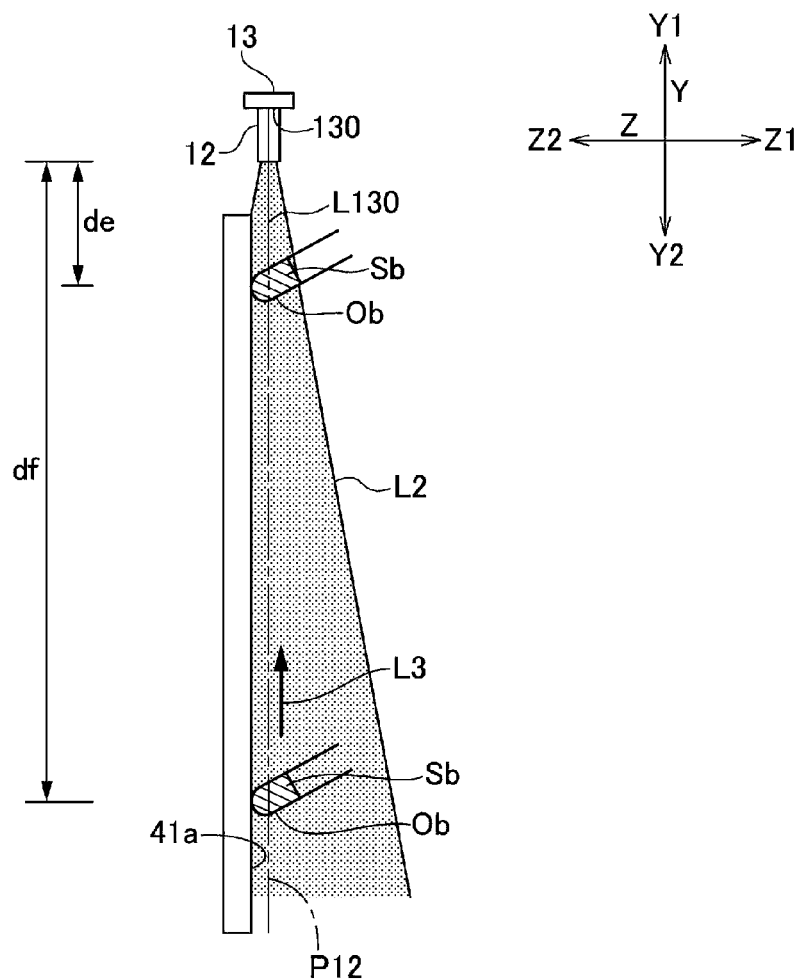
FIG. 15 is an explanatory view of the direction or the like of a light receiving element of a position detection system according to a reference example.

An example in which a projection display system with position detection function is configured using the visual recognition surface forming member 40 as a screen will be described with reference to FIG. 14. FIG. 14 is an explanatory view of Specific Example 2 of the position detection system 1 to which the invention is applied (display system with input function or projection display system with input function). In the projection display system with position detection function of this embodiment, the position detection system 1 and the configuration of the position detection system 1 are similar to the configurations described with reference to FIGS. 1A to 12B. Therefore, the same parts are denoted by the same reference numerals and will not be described further in detail. In a projection display system with input function 200 shown in FIG. 14 (display system with input function), an image is projected onto a screen 80 (visual recognition surface forming member 40) from an image projection device 250 (image generating device) called liquid crystal projector or digital micromirror device. In this projection display system with input function 200, the image projection device 250 (projection display unit) enlarges and projects image display light Pi toward the screen 80 from a projection lens system 210 provided in a casing 240. Here, the image projection device 250 projects the image display light Pi toward the screen 80 from a direction slightly inclined from the Y-axis direction. Therefore, a screen surface 80a of the screen 80 on which the image is projected forms the visual recognition surface 41 (reference surface 41a) where information is visually recognized.

In this projection display system with input function 200, the position detection system 1 is attached and integrated with the image projection device 250. Therefore, the position detection system 1 emits the detection light L2 along the screen surface 80a from a position different from the projection lens system 210 and detects the reflected light L3 reflected by the designating member Ob. Thus, when the designating member Ob is brought closer to a portion of the image projected on the screen 80, the position of the designating member Ob can be detected and therefore the position of the designating member Ob can be used as input information such as an image switching instruction.

If the position detection system 1 and the screen 80 are integrated together, a screen device with input function can be configured.

Other Specific Examples of Position Detection System 1

In this invention, as the visual recognition surface forming member 40, a light-transmissive member that covers an exhibit can be employed. In such case, the visual recognition surface 41 is a surface where the exhibit can be visually recognized, opposite to the side where the exhibit is arranged on the light-transmissive member. With this configuration, the system can be configured as a window system with input function or the like.

Moreover, as the visual recognition surface forming member 40, a board that supports a moving game medium can be employed. In this case, the visual recognition surface 41 is a surface on the side where the relative position between the board and the game medium can be visually recognized on the board. With this configuration, an amusement device such as pachinko pinball game machine or coin game machine can be configured as an amusement system with input function or the like.

The entire disclosure of Japanese Patent Application No. 2011-156431, filed Jul. 15, 2011 is expressly incorporated by reference herein.

What is claimed is:

1. A display system with input function comprising a display device having a display surface within a plane prescribed by a first direction and a second direction which are orthogonal to each other, and a position detection system for detecting a position of a designating member situated on one side in a third direction orthogonal to the display surface, wherein an image displayed on the display surface is switched based on a result of position detection of the designating member by the position detection system, wherein the designating member has a retroreflection portion on an outer peripheral surface, the position detection system includes:

a light source unit which emits detection light radially along an imaginary plane which is set to face the display surface on the one side in the third direction, the light source being spaced apart from the display surface in the third direction;

a light receiving element which receives the detection light reflected by the designating member, the light receiving element being located next to the light source on the one side in the third direction in relation to the display surface and being spaced apart from the display surface in the third direction; and a position detecting unit which detects a position of the designating member in an in-plane direction of the display surface, based on an output from the light receiving element, wherein a normal direction to a light receiving surface of the light receiving element intersects with the display surface, the imaginary plane is inclined in relation to the reference surface, and a half-value angle of exit intensity in the third direction of the light source unit is equal to an angle formed by the imaginary plane and the reference surface.

2. A display system with input function comprising a screen having a screen surface within a plane prescribed by a first direction and a second direction which are orthogonal to each other, an image projection device which projects an image onto the screen surface, and a position detection system for detecting a position of a designating member situated on one side in a third direction orthogonal to the screen surface, wherein an image displayed on the screen surface is switched based on a result of position detection of the designating member by the position detection system, wherein the position detection system includes:

a light source unit which emits detection light radially along an imaginary plane which is set to face the screen surface on the one side in the third direction, the light source being spaced apart from the screen surface in the third direction;

a light receiving element which receives the detection light reflected by the designating member, the light receiving element being located next to the light source on the one side in the third direction in relation to the screen surface and being spaced apart from the screen surface in the third direction; and a position detecting unit which detects a position of the designating member in an in-plane direction of the screen surface, based on an output from the light receiving element, wherein a normal direction to a light receiving surface of the light receiving element intersects with the screen surface, the imaginary plane is inclined in relation to the reference surface, and a half-value angle of exit intensity in the third direction of the light source unit is equal to an angle formed by the imaginary plane and the reference surface.

3. A position detection system comprising:

a reference surface prescribed by a first direction and a second direction which are orthogonal to each other;

a light source unit which emits detection light radially along an imaginary plane which is set to face the reference surface on one side in a third direction orthogonal to the first direction and the second direction;

a designating member having a retroreflection portion on an outer peripheral surface and situated on the one side in the third direction in relation to the reference surface;

a light receiving element which receives the detection light reflected by the designating member, the light receiving element being located on the one side of the third direction in relation to the reference surface; and a position detecting unit which detects a position of the designating member in an in-plane direction of the reference surface, based on an output from the light receiving element, wherein a normal direction to a light receiving surface of the light receiving element intersects with the reference surface, the imaginary plane is inclined in relation to the reference surface, and a half-value angle of exit intensity in the third direction of the light source unit is equal to an angle formed by the imaginary plane and the reference surface.

4. The position detection system according to claim 3, wherein the light receiving surface is situated further on the one side in the third direction than the imaginary plane.

5. The position detection system according to claim 3, wherein the light source unit reduces light intensity from one side toward the other side of an exit angle range of the detection light during a first period and reduces light intensity from the other side toward the one side of the exit angle range of the detection light during a second period that does not overlap the first period, and the position detecting unit detects the position of the designating member in the in-plane direction of the reference surface, based on a result of comparison between an output from the light receiving element during the first period and an output from the light receiving element during the second period.

* * * * *